United States Patent [19]

Ishizaki

[11] 4,452,062

[45] Jun. 5, 1984

[54] METHOD OF MANUFACTURING BATTERY LID

[75] Inventor: Morio Ishizaki, Kobe, Japan

[73] Assignee: Ishizaki Press Kogyo Co., Ltd., Itami, Japan

[21] Appl. No.: 459,034

[22] Filed: Jan. 18, 1983

Related U.S. Application Data

[62] Division of Ser. No. 251,539, Apr. 6, 1981, Pat. No. 4,419,420.

[51] Int. Cl.³ .............................................. B21D 22/00
[52] U.S. Cl. ........................................ 72/348; 72/379
[58] Field of Search .......................... 72/348, 349, 379

[56] References Cited

U.S. PATENT DOCUMENTS

| | | | |
|---|---|---|---|
| 3,367,165 | 2/1968 | Coen | 72/348 |
| 3,735,719 | 5/1973 | Puzik | 72/348 |
| 3,786,667 | 1/1974 | Garnett | 72/351 |

*Primary Examiner*—Leon Gilden
*Attorney, Agent, or Firm*—Cushman, Darby & Cushman

[57] ABSTRACT

A cathode lid of a battery container having a peripheral portion U letter shaped in section, with the outer peripheral side formed thicker than the inner peripheral side, and a side formed thicker than the inner peripheral side, and a method of manufacturing the same. In a process of manufacture of the anode lid, the periphery of a blank of a disk is bent in one direction vertical to the surface thereof, thereby to achieve a structure of a vessel having a bent periphery and then the vessel structure is subjected to paired working processes of punch and knockout, whereby a pressing force is exerted so that the edge of the bent periphery and the central portion of the main flat portion of the blank comes to to be close to each other in the direction vertical to the surface of the blank. As a result, the periphery is formed to be U letter shaped in section, while the central portion is maintained flat.

1 Claim, 15 Drawing Figures

METHOD OF MANUFACTURING BATTERY LID

This is a division of application Ser. No. 251,539, filed Apr. 6, 1981, now U.S. Pat. No. 4,419,420.

BACKGROUND OF THE INVENTION

1. Field of the Invention

The present invention relates to a lid of a battery container and a method of manufacturing the same. More specifically, the present invention is directed to an improvement in geometry and structure of a curled portion of a lid and a main body of a battery container largely influencing leakage of an electrolyte and also to an improvement in a method for manufacturing such lid.

2. Description of the Prior Art

FIG. 1 is a front view, partially in section, showing a conventional silver oxide battery for explaining the prior art of interest to the present invention. FIGS. 2 to 8 are end views of mid-sectioned part showing in succession different steps of a method of manufacturing the lid used in the FIG. 1 battery.

The silver oxide battery shown is a so-called button type battery which has been widely used as a power supply for an electronic wristwatch, for example. The battery container comprises an cathode container element 1 constituting a main body of the battery container and a anode container element constituting a lid of the battery container. The cathode container element 1 or the main body is made of an iron plate nickel plated and an cathode material 2, a separator 3 and a anode material 4 are in succession placed in a laminated fashion in the cathode container 1. The anode container element 5 or the lid is then placed on the anode material 4. The anode container element 5 is made of stainless steel and a copper layer is formed on the inner surface thereof, while the outer surface thereof is formed with a nickel layer.

The anode container element 5 is formed with a periphery portion 6 U letter shaped in section. A packing 7 is disposed substantially outside of the peripheral portion 6 and, when the opening edge of the anode container element 1 is curled inside, the same is engaged with the peripheral portion 6 of the cathode container element 5 with the packing 7 therebetween. As a result, a sealing structure for preventing a leakage phenomenon of an electrolyte is achieved.

Since the above described anode container element 5 has the peripheral portion 6 folded in a U letter shape in section, the periphery of the anode container element has an increased strength to buckling. However, since the hardness of a portion being curled largely contributes to prevention of leakage of an electrolyte, a much more increased hardness is desired.

An insufficient hardness of the peripheral portion 6 of the conventional anode container element 5 which is engaged with the opening edge of the cathode container element 1 is presumably caused by a conventional manufacturing process to be set forth in the following. According to a conventional manufacturing process, a blank 8 is cut to a desired shape and size is prepared as shown in FIG. 2. Then the blank 8 is subjected to a pressing process by means of an upper drawing die 9 and a lower drawing die 10, whereby the blank 8 undergoes a first drawing process. At that time, the outer peripheral portion of the blank 8 is strongly sandwitched to prevent from wrinkling, so that the thickness of the outer peripheral portion is decreased. Then the blank 8 is subjected to a second drawing process by means of an upper drawing die 11 and a lower drawing die 12, as shown in FIG. 4. Again in this step the thickness of the outer peripheral portion of a material being worked 13 is decreased. Then the material being worked 13 is subjected to cutting to be trimmed to a desired size in diameter, as shown in FIG. 5. Thereafter, as shown in FIG. 6, the flange portion 14 at the outer periphery of the material being processed 13 is slightly bent preparatively upward as viewed. Then, as shown in FIG. 7, the flange portion 14 of the material being worked 13 is fully bent so that the periphery of the material being worked 13 may be U letter shaped in section. Then ultimately, as shown in FIG. 8, the flange portion 14 is further pressed, whereby the flange portion 14 is brought to be closer to the main body portion of the material 13. Thus the anode container element 5 as shown in FIG. 8 is obtained and the flange portion 14 constitutes a portion of the abovedescribed peripheral portion 6 U letter shaped in section.

It has been observed that according to such conventional process the steps as shown in FIGS. 3 and 4 and 6 to 8 involve some problems. This will be described in more detail with reference to FIG. 9, which shows in an enlarged manner the peripheral portion of the lid.

A first problem is that the thickness of the outer peripheral portion of the blank 8 or the material being worked 13 is decreased to be made thin at the steps shown in FIGS. 3 and 4. The outer peripheral portion thereof is ultimately brought to the position of the outer peripheral side 6a of the peripheral portion 6 U letter shaped in section. Accordingly, the outer peripheral side 6a thus made thin naturally exhibits an inferior strength. A second problem arises when the flange portion 14 is folded so that the peripheral portion 6 U letter shaped in section is formed at the steps shown in FIGS. 6 to 8. More specifically, at the steps shown in FIGS. 6 and 7 only a natural bent portion is formed by folding the flange portion 14 and no work hardening is not performed. The FIG. 8 step is then carried out in such situation and the outer peripheral side 6a of the peripheral portion 6 U letter shaped in section is brought to be close to the inner peripheral side 6b so that the spacing may be decreased, as shown in FIG. 9. As a result, the bent portion 6c becomes thinner and weak.

For the above described reasons, a sufficient strength of the outer peripheral side 6a of the peripheral portion 6 enough to withstand the pressure caused in a curling process was not attained.

SUMMARY OF THE INVENTION

In brief, conventionally it was simply believed that by folding a peripheral portion to be U letter shaped in section the strength of an anode container element or a lid of a battery container is increased and accordingly leakage of an electrolyte is prevented. However, in actuality it has been observed that there is much room left for improvement both in the strength to withstand curling and in prevention of leakage of an electrolyte.

The present invention is aimed to eliminate such problems as left unsolved. Briefly described, the present invention relates to a change in a sectional structure of a lid of a battery container. More specifically, a sectional configuration of a lid of a battery container is changed so that a lid having a predetermined volume of material may bring about the best advantage both in strength to withstand curling and prevent leakage of an electrolyte, inasmuch as the volume in material of the lid most effectively contributes to improvement in the strength and improvement in prevention of leakage of an electrolyte.

More specifically, according to the present invention, a lid of a battery container element is formed with a peripheral portion U letter shaped in section, wherein the outer peripheral side of the peripheral portion U letter shaped in section is made thicker than the inner peripheral side of the peripheral portion U letter shaped in section. In order to manufacture a lid of such shape in section, a blank cut to the size of a lid to be attained is prepared and the periphery of the blank is bent in one direction vertical to the surface of the blank and then the blank is subjected to pressure so that the edge of the bent portion comes to be close to the central portion of a main flat portion of the blank in terms of the direction vertical to the surface of the blank, whereby the periphery of the blank is formed to be U letter shaped in section. By the above described pressing step the thickness of the outer peripheral side of the peripheral portion U letter shaped in section is favorably increased as compared with the thickness of the inner peripheral side.

In a preferred embodiment of the present invention, the step of forming the sectionally U letter shaped portion comprises the step of plastic deformation for biasing the material of the inner peripheral side at the lower end of the peripheral portion U letter shaped in section toward the outer peripheral side. As a result, a portion of an increased thickness is formed in the outer peripheral side and at the same time working hardening contributing to enhancement of the strength is also brought about.

In another preferred embodiment of the present invention, the step of forming the peripheral portion U letter shaped in section comprises the step of plastic deformation for forming an oblique surface outward at the upper end of the outer peripheral side of the peripheral portion U letter shaped in section. As a result, a lid that can be advantageously utilized in a very thin battery container is provided.

Accordingly, a principal object of the present invention is to provide a lid of a battery container having a structure which is capable of fully withstanding a curling force and preventing leakage of an electrolyte, and a method of manufacturing the same.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 10:
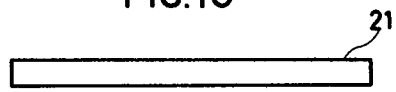
FIGS. 10 to 12 are end views of mid-sectioned part showing in succession the steps of the inventive method.
Figure 11:
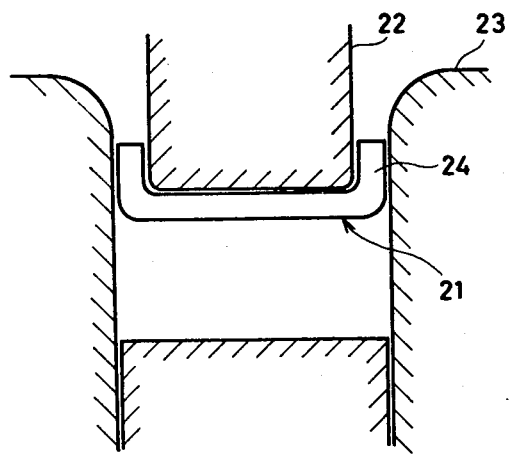
Figure 12:
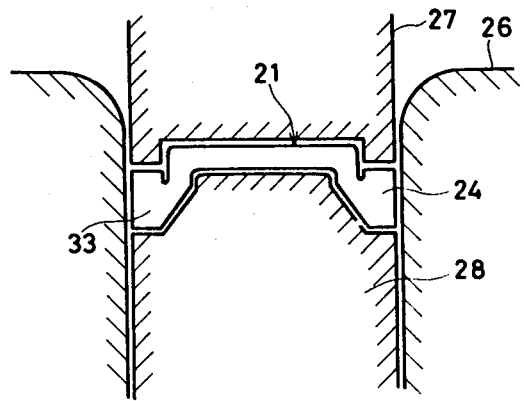
Figure 13:
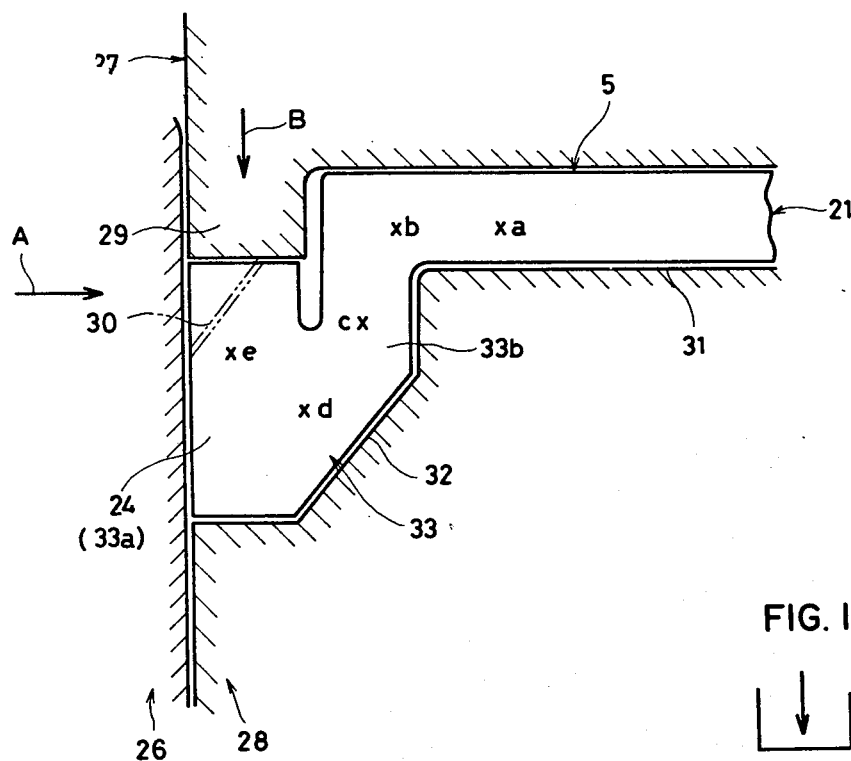
FIG. 13 is an enlarged view of the FIG. 12 step.

FIGS. 10 to 12 are end views of mid-sectioned part showing in succession the steps in accordance with one embodiment of the inventive method. FIG. 13 is an enlarged view showing the FIG. 12 step.

Referring to FIG. 10, a blank 21 is prepared which is cut to the size for an anode container element serving as a lid of a battery container to be obtained. The size of the blank 21 is determined taking into consideration a margin being bent in a bending process to be described subsequently.

Referring to FIG. 11, the blank 21 is subjected to a bending process at the outer peripheral portion by means of a punch 22 and a die 23. Since a portion being bent 24 of the blank 21 existing between the punch 22 and the die 23 has a sufficient clearance, the thickness of the blank 21 is not decreased at the peripheral portion, as compared with a drawing process conventionally employed. The outer diameter of the portion 24 being bent is defined by the inner diameter of the die 23 and the inner diameter of the die is selected to be equal to the outer diameter of an anode container element to be obtained.

Referring to FIGS. 12 and 13, the blank 21 which is a material being further worked or processed is pressed between a punch 27 and a knockout 28, while the same is confined by a die 26, whereby the material being worked is forcedly formed to a desired shape. More specifically, the punch 27 is formed with an acting portion 29 for pressing the edge of the portion being bent 24. The knockout 28 is formed with an acting portion 31 for pressing the central portion of the main flat area of the blank 21, with an oblique surface 32 formed outward and upward on the outer peripheral surface of the acting portion 31.

When the blank 21 is pressed by the above described punch 27 and the knockout 28, the blank is formed into a shape wherein the central portion of the main flat area of the blank 21 is relatively swelled upward, while the portion being bent becomes thicker or increases the thickness. More specifically, the material of the inner peripheral side 33b at the lower end of the peripheral portion 33 U letter shaped in section partially constituted by the portion being bent 24 is moved or biased toward the outer peripheral side 33a as a function of the oblique surface 32. As a result, a thickness for sufficiently withstanding the force exerted in the direction A which becomes the maximum stress on the occasion of a curling process is achieved. Furthermore, such thickness can also fully withstand the force exerted in the direction B being applied in a secondary manner on the occasion of the curling process.

Furthermore, it is further to be noted that hardening is caused due to working of the material at the outer peripheral side 32a in particular of the peripheral portion 33 U letter shaped in section due to pressure between the above described punch 27 and the knockout 28. It is to be further noted that the portion of the inner peripheral side 33b as shaped along the oblique surface 32 of the knockout 28 comes to perform a function of a rib with the excessive material thereat. It has been observed that the above described hardening through the working process and the above described rib effect advantageously act on a curling process. In addition, the above described hardening through working and the above described rib effect also advantageously act on prevention of leakage of an electrolyte and adhesiveness of the packing 7.

Figure 14:
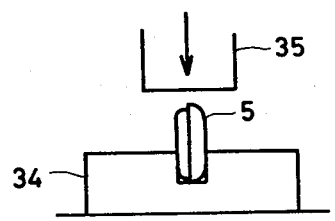
FIG. 14 is a view showing a test method employed to confirm the effect of the present invention.

FIG. 14 shows a manner of testing the effect of the present invention. Referring to FIG. 14, both the anode container element obtained in accordance with the conventional method and the anode container element obtained in accordance with the inventive method are placed in the vertical direction with the same supported by a jig 34. Then the same is pressed from upward by a presser 35 and the maximum compression load on the occasion of the primary buckling was measured. An average value was evaluated by five values measured on five samples on each of the conventional ones and the inventive ones and as a result the average value for the conventional ones was 16.60 kg whereas the average value of the inventive ones was 17.25 kg. Thus it was substantiated that the present invention is superior to the conventional one.

Figure 9:
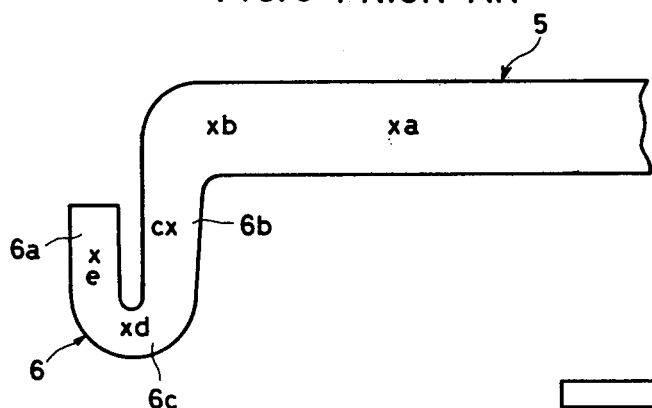
FIG. 9 is an enlarged view of the peripheral portion of the lid.

Furthermore, the hardness of the respective portions of the conventional ones and the inventive ones was measured and the following result was obtained. More specifically, the Vickers' hardness was measured with respect to each of the portions a to e in FIGS. 9 and 13 using a Vickers' hardness tester under the measurement condition of 15 sec. with a load of 200 g. As a result, at the point a, the conventional one was 208, whereas the inventive one was 205, at the point b, the conventional one was 296, whereas the inventive one was 253, at the point c, the conventional one was 306, whereas the inventive one was 381, at the point d, the conventional one was 369, whereas the inventive one was 446, and at the point e, the conventional one was 369, whereas the inventive one was 420.

Thus it was confirmed that hardening through working has occurred particularly at the peripheral portion 33 U letter shaped in section.

Figure 1:
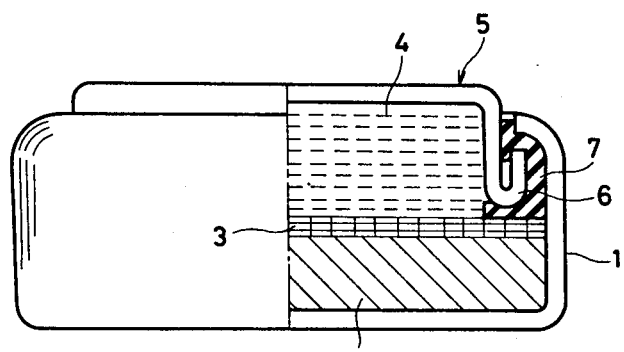
FIG. 1 is a front view, partially in section, showing a conventional silver oxide battery for explaining the prior art of interest to the present invention.
Figure 2:
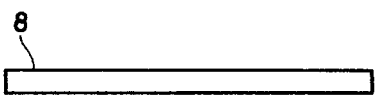
FIGS. 2 to 8 are end views of mid-sectioned part showing in succession the different steps of manufacturing the lid of the FIG. 1 battery.
Figure 3:
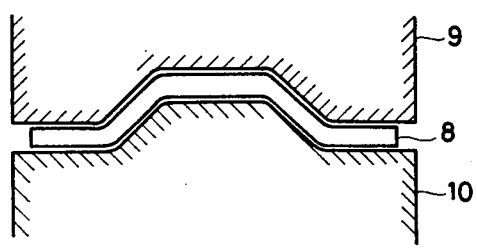
Figure 4:
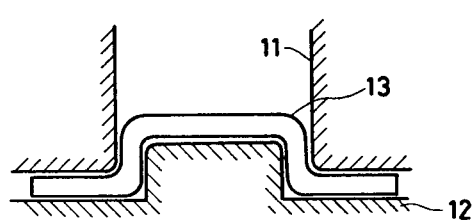
Figure 5:
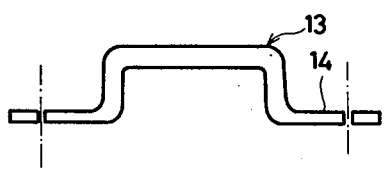
Figure 6:
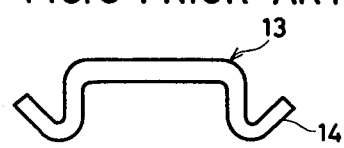
Figure 7:
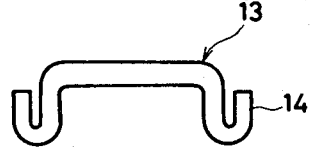
Figure 8:
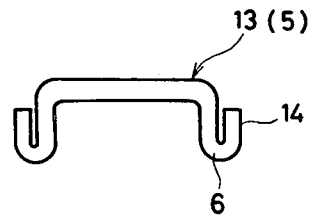
Figure 15:
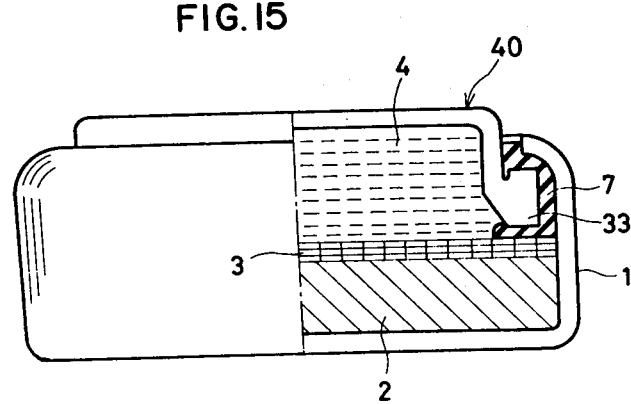
FIG. 15 is a front view, partially in section, showing a silver oxide battery completed using an anode container element achieved in accordance with the present invention.

FIG. 15 is a front view, partially in section, showing a silver oxide battery implemented using an anode container element fabricated in accordance with the present invention. The anode container element practicing the present invention is denoted by the reference numeral 40. The other elements are the same as those shown in FIG. 1 and hence the same portions have been denoted by the same reference numerals and a description thereof is omitted.

Referring to FIG. 15, the anode container element 40 comprises the peripheral portion 33 U letter shaped in section attained in accordance with the above described process. The anode container element 40 and the cathode container element 1 are mechanically coupled through mutual engagement of the peripheral portion 33 of the anode container element 40 and the opening edge of the cathode container element 1. More specifically, the packing 7 is disposed outside the peripheral portion 6 and the opening edge of the cathode container element 1 is curled inward. As a result, a tight seal structure for preventing leakage of an electrolyte is achieved.

Meanwhile, referring to FIGS. 12 and 13, an outer surface extending straight in the upward and downward direction was formed on the outer peripheral side 33a of the peripheral portion 33 U letter shaped in section. In addition, the above described outer surface has been prolonged in the upward and downward direction on the straight extending surface, as compared with a case where the conventional outer peripheral side 6a is formed to extend from the bent portion 6c as naturally bent. The above described straight outer surface extending in the upward and downward direction plays an important role in ensuring a tight seal with the packing 7 on the occasion of curling in the direction A performed in the curling operation of the cathode container element 1. In this context, the longer the straight outer surface the better in preventing leakage of an electrolyte. According to the present invention, it becomes more easy to form longer the outer surface extending straight in the upward and downward direction.

According to another embodiment of the present invention, a particularly thin or low battery container can be advantageously provided as shown by a phantom line in FIG. 13. More specifically, the acting portion 29 of the punch 27 is further formed with an oblique surface 30 which is inwardly and downwardly oblique. This oblique surface makes it possible to form an outwardly oblique surface at the upper end of the outer peripheral side 33a of the peripheral portion 33.

According to the cathode container element 5 formed with an oblique surface faced outward at the upper end of the outer peripheral side 33a, the opening end portion of the cathode container element 1 is received by the above described oblique surface when the opening end of the cathode container element 1 is curled inward and therefore a fatal disadvantage of the conventional approach that the opening edge of the cathode container element 1 further protrudes from the outer main surface of the cathode container element 5 is advantageously eliminated.

As described in the foregoing, according to the inventive lid of a battery container, the outer peripheral side of the peripheral portion U letter shaped in section can be formed in an increased thickness and therefore a sufficient strength to withstand the load on the occasion of curling is provided and accordingly a curling operation can be made with a sufficient strength, thereby to enable an assured tight seal structure, with the result that leakage of an electrolyte is effectively prevented.

According to the inventive method, a blank of a predetermined size is first bent in one direction vertical to the surface of the blank at the periphery thereof and then the blank is subjected to depression so that the edge of the portion being bent comes to be close to the central portion of the main flat portion of the blank in terms of the direction vertical to the blank, whereby the peripheral portion is U letter shaped in section and therefore the outer peripheral side of the peripheral portion U letter shaped in section in particular can be readily made thick. Furthermore, in the process of forming the peripheral portion in a U letter shape in section, this portion is advantageously subjected to hardening due to working.

It is to be pointed out that the present invention is not limited to fabrication of a battery container for a silver oxide battery but the present invention can be equally applied to a battery container of any other types of batteries, such as a silver peroxide battery, a mercury battery, a lythium battery, a closed type nickel-cadmium battery, a alkaline-manganese dry batter and the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a lid of a battery container having a peripheral portion U letter shaped in section for engagement with a main body having an opening edge of said battery container through a packing with said opening edge of said main body of said container curled inward, comprising the steps of:

preparing a blank cut to the size of a lid being obtained;

bending the periphery of said blank in one direction vertical to the surface of said blank to produce a U-shaped periphery; and pressing the edge of the bent portion of said blank and the central portion of the main flat portion of said blank in the directions toward each other in terms of the direction vertical to the surface of said blank to plastically deform the lower edge of said peripheral portion so that the material at the inner peripheral side at the lower end of said U-shaped periphery is biased toward the outer peripheral edge so as to form on said lower end a horizontal surface facing downward, an oblique surface extending from the inner peripheral edge of said horizontal surface and facing downward and inward, and a vertical surface extending from the outer peripheral edge of said horizontal surface and facing outward.

* * * * *